United States Patent
Carpino, II

(10) Patent No.: US 11,975,850 B2
(45) Date of Patent: May 7, 2024

(54) INTEGRATED BUSBAR HEATER FOR ICE PROTECTION SYSTEMS

(71) Applicant: Goodrich Corporation, Charlotte, NC (US)

(72) Inventor: Richard J. Carpino, II, Canton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 357 days.

(21) Appl. No.: 17/200,792

(22) Filed: Mar. 13, 2021

(65) Prior Publication Data

US 2021/0309376 A1    Oct. 7, 2021

Related U.S. Application Data

(60) Provisional application No. 63/006,422, filed on Apr. 7, 2020.

(51) Int. Cl.
*B64D 15/12* (2006.01)
*B64D 15/22* (2006.01)
*H05B 3/06* (2006.01)

(52) U.S. Cl.
CPC ............. *B64D 15/22* (2013.01); *B64D 15/12* (2013.01); *H05B 3/06* (2013.01); *H05B 2214/02* (2013.01)

(58) Field of Classification Search
CPC .......... B64D 15/12; B64D 15/22; H05B 3/06; H05B 2214/02
See application file for complete search history.

(56) References Cited

U.S. PATENT DOCUMENTS

| | | | | |
|---|---|---|---|---|
| 2,464,273 A | * | 3/1949 | Tanchel | B64D 15/12 244/134 D |
| 2,757,273 A | * | 7/1956 | Taylor | B64D 15/12 219/535 |
| 5,351,918 A | * | 10/1994 | Giamati | B64D 15/12 244/134 R |
| 6,031,214 A | | 2/2000 | Bost et al. | |
| 6,338,455 B1 | | 1/2002 | Rauch et al. | |
| 9,868,536 B2 | | 1/2018 | Miller et al. | |
| 2010/0199629 A1 | * | 8/2010 | Chene | F02C 7/045 60/39.093 |
| 2017/0275006 A1 | | 9/2017 | Bremmer et al. | |
| 2018/0346133 A1 | | 12/2018 | Paulson et al. | |
| 2019/0071185 A1 | | 3/2019 | Paulson et al. | |

(Continued)

FOREIGN PATENT DOCUMENTS

EP   3501989   6/2019
JP   H04231292   8/1992

OTHER PUBLICATIONS

European Patent Office, European Partial Search Report dated Aug. 26, 2021 in Application No. 21166465.1.

(Continued)

*Primary Examiner* — Michael H Wang
(74) *Attorney, Agent, or Firm* — SNELL & WILMER L.L.P.

(57) ABSTRACT

An ice protection system may comprise an electrical heating mat of an electrically resistive material, wherein the electrically resistive material defines at a first spanwise zone and a first chordwise zone, wherein at least one of the first spanwise zone or the first chordwise zone include a first busbar portion contiguous with the electrically resistive material.

10 Claims, 11 Drawing Sheets

(56) References Cited

U.S. PATENT DOCUMENTS

2019/0084682 A1\* 3/2019 Aubert ................... B64D 15/22
2019/0145384 A1 5/2019 Spandley et al.

OTHER PUBLICATIONS

European Patent Office, European Search Report dated Dec. 2, 2021 in Application No. 21166465.1.
European Patent Office, European Office Action dated Apr. 21, 2023 in Application No. 21166465.1.

\* cited by examiner

INTEGRATED BUSBAR HEATER FOR ICE PROTECTION SYSTEMS

CROSS-REFERENCE TO RELATED APPLICATIONS

This application claims priority to, and the benefit of, U.S. Provisional Application No. 63/006,422, filed Apr. 7, 2020 and titled "INTEGRATED BUSBAR HEATER FOR ICE PROTECTION SYSTEMS," which is incorporated by reference herein in its entirety for all purposes.

FIELD

The disclosure relates generally to ice protection systems, more specifically, to de-icing or ice protection systems for aircraft including electrical heating elements.

BACKGROUND

In operation, aircraft may experience conditions in which icing may occur. For example, a proprotor blade of an aircraft, as well as other parts of the aircraft such as the wing leading edge, may experience the formation of ice when operating in cold or below-freezing temperatures and subjected to liquid water content. The formation of such ice may dramatically alter one or more flight characteristics of the aircraft. For example, the formation of ice may deleteriously affect the aerodynamics of the aircraft and add additional undesirable weight, induce undesirable vibrations, as well as generate a hazard when such ice breaks off and potentially strikes another portion of the aircraft. For example, ice breaking loose from the proprotor may be ingested by the aircraft engine, thereby damaging the engine, or may strike the fuselage or other aerodynamic surfaces.

SUMMARY

In various embodiments, ice protection system is disclosed comprising an electrical heating mat of an electrically resistive material, wherein the electrically resistive material defines at a first spanwise zone and a first chordwise zone, wherein at least one of the first spanwise zone or the first chordwise zone include a first busbar portion contiguous with the electrically resistive material.

In various embodiments, the electrically resistive material is a metallic foil. In various embodiments, the first contiguous busbar portion extends along a spanwise axis parallel to the first spanwise zone. In various embodiments, the first spanwise zone is inboard of the first chordwise zone. In various embodiments, the electrical heating mat further defines a second spanwise zone, a third spanwise zone, a second chordwise zone, and a third chordwise zone. In various embodiments, the second chordwise zone is outboard of the first chordwise zone, the third chordwise zone is outboard of the second chordwise zone, and each of the second spanwise zone and the third spanwise zone are inboard of the first chordwise zone. In various embodiments, the electrical heating mat further defines a second busbar portion wherein each of the first busbar portion and the second busbar portion are contiguous with the first chordwise zone. In various embodiments, a chordwise extent along a chordwise axis of each of the first spanwise zone, the second spanwise zone, and the third spanwise zone is delimited by the first busbar portion and the second busbar portion. In various embodiments, the system further comprises a second electrical heating mat of the electrically resistive material. In various embodiments, the first spanwise zone and the first chordwise zone are defined by a respective first resistive element and a second resistive element, wherein the busbar portion is monolithic with at least one of the first resistive element or the second resistive element.

In various embodiments control system for a de-icing system is disclosed comprising an electrical heating mat, a controller, and a tangible, non-transitory memory configured to communicate with the controller, the tangible, non-transitory memory having instructions stored thereon that, in response to execution by the controller, cause the controller to perform operations comprising receiving an enable command from a control interface, polling a sensor for a sensor data, receiving the sensor data from the sensor, passing the sensor data to an ice protection logic, determining via the ice protection logic an icing condition, and applying an electrical current to a first busbar portion of the electrical heating mat.

In various embodiments, the sensor data includes an air temperature data and a liquid water content data, wherein the ice protection logic determines the icing condition based on the air temperature data and the liquid water content data. In various embodiments, the operations further comprise receiving an activate command from the control interface, passing the activate command to the ice protection logic, and applying via the ice protection logic and in response to the activate command the electrical current to the first busbar portion of the electrical heating mat. In various embodiments, the electrical heating mat comprises an electrically resistive material, wherein the electrically resistive material defines a first spanwise zone and a first chordwise zone, wherein at least one of the first spanwise zone or the first chordwise zone include the first busbar portion contiguous with the electrically resistive material, and wherein the operations further comprise applying the current simultaneously to the first spanwise zone and the first chordwise zone.

In various embodiments, the electrically restive material further defines a second spanwise zone, a third spanwise zone, a second chordwise zone, and a third chordwise zone, wherein the first busbar portion extends along a spanwise axis parallel to the first spanwise zone, wherein the first spanwise zone is inboard of the first chordwise zone. In various embodiments, the second chordwise zone is outboard of the first chordwise zone, the third chordwise zone is outboard of the second chordwise zone, and each of the second spanwise zone and the third spanwise zone are inboard of the first chordwise zone. In various embodiments, the electrical heating mat includes a second busbar portion wherein each of the first busbar portion and the second busbar portion are contiguous with the first chordwise zone, wherein a chordwise extent along a chordwise axis of each of the first spanwise zone, the second spanwise zone, and the third spanwise zone is delimited by the first busbar portion and the second busbar portion. In various embodiments, the first spanwise zone and the first chordwise zone are defined by a respective first resistive element and a second resistive element, wherein the first busbar portion is monolithic with at least one of the first resistive element or the second resistive element and configured to operate as an additional heating element of the respective zone.

In various embodiments, a method of de-icing comprises receiving, by a controller, an enable command from a control interface, polling a sensor for sensor data, receiving the sensor data from the sensor, passing the sensor data to an ice protection logic, determining via the ice protection logic an icing condition, and applying an electrical current to a first busbar portion of an electrical heating mat, wherein the sensor data includes an air temperature data and a liquid water content data, wherein the ice protection logic determines the icing condition based on the air temperature data and the liquid water content data.

In various embodiments, the method includes receiving an activate command from the control interface, passing the activate command to the ice protection logic, and applying via the ice protection logic and in response to the activate command the electrical current to the first busbar portion of the electrical heating mat.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosures, it should be understood that other embodiments may be realized and that logical, chemical, and mechanical changes may be made without departing from the spirit and scope of the disclosures. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

The use of terms such as "above," "below," "upper," "lower," "forward," "aft", "inboard", "outboard", "dorsal", "ventral" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
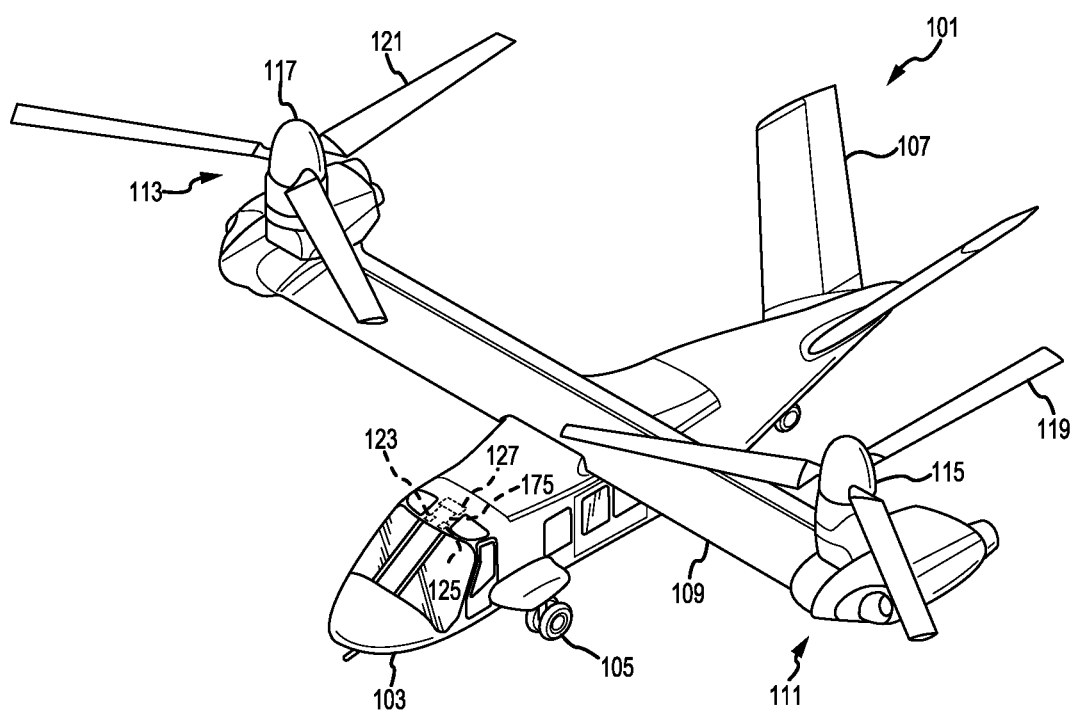
FIG. 1A illustrates a perspective view of a tiltrotor aircraft in helicopter mode, in accordance with various embodiments.
Figure 1B:
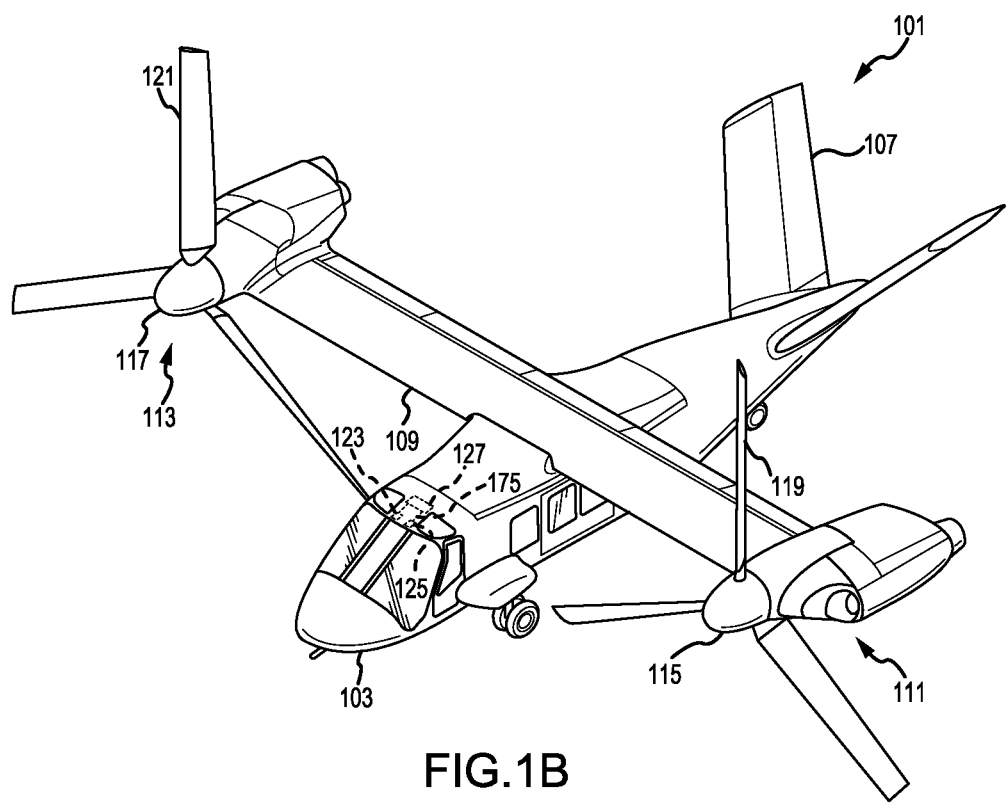
FIG. 1B illustrates a perspective view of a tiltrotor aircraft in airplane mode, in accordance with various embodiments.

In various embodiments and with reference to FIGS. 1A and 1B, an aircraft such as, for example, tiltrotor aircraft 101 is illustrated. Although depicted with reference to tiltrotor aircraft 101, it will be appreciated that the ice protection system and methods therefor may be used on other rotary aircraft, including helicopters, tilt wing aircrafts, quad tiltrotor aircraft, unmanned aerial vehicles (UAVs), and other vertical lift or VTOL aircrafts, or can further be used with any device configured with a rotor blade and/or airfoil susceptible to an ice buildup, including fixed wing aircraft, turbine blades, devices with propellers, windmills, and wind turbines.

Tiltrotor aircraft 101 may include a fuselage 103, a landing gear 105, a tail member 107, a wing 109, a first propulsion system 111, and a second propulsion system 113. Each propulsion system 111, 113 includes a fixed engine such as, for example, a gas turbine engine and a rotatable proprotor 115, 117, respectively. Each rotatable proprotor 115, 117 has a plurality of rotor blades 119, 121, (i.e., proprotor blades) respectively, associated therewith. The position of proprotors 115, 117, as well as the pitch of rotor blades 119, 121, can be selectively controlled in order to selectively control direction, thrust, and lift of tiltrotor aircraft 101.

FIG. 1A illustrates tiltrotor aircraft 101 in helicopter mode, in which proprotors 115 and 117 are positioned substantially vertical to provide a lifting thrust. FIG. 1B illustrates tiltrotor aircraft 101 in an airplane mode, in which proprotors 115,117 are positioned substantially horizontal to provide a forward thrust in which a lifting force is supplied by wing 109. It should be appreciated that tiltrotor aircraft can be operated such that proprotors 115,117 are selectively positioned between airplane mode and helicopter mode, which can be referred to as a conversion mode.

Figure 2:
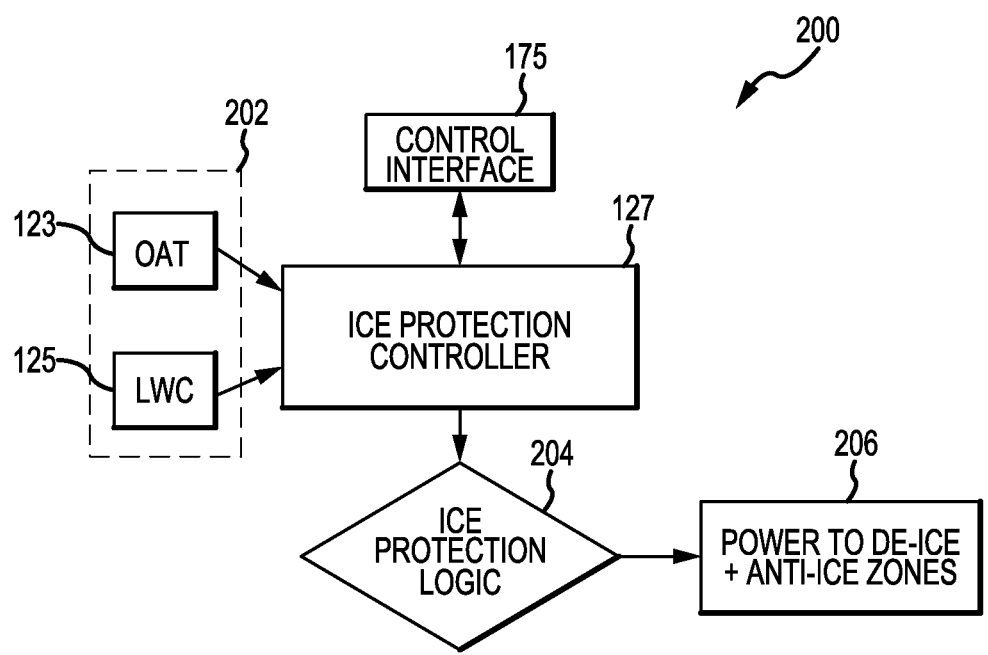
FIG. 2 illustrates a schematic block diagram of a control system for an ice protection system, in accordance with various embodiments.

In various embodiments and with additional reference to FIG. 2, a control system 200 for aircraft ice protection is illustrated in accordance with various embodiments. Tiltrotor aircraft 101 includes a plurality of sensors 202 to monitor and measure characteristics of aircraft 101. The sensors 202 may be coupled to or in direct electronic communication with aircraft systems such as, for example, propulsion systems 111, 113. The sensors 202 may comprise a temperature sensor, a torque sensor, a speed sensor, a pressure sensor, a position sensor, an accelerometer, or any other suitable measuring device known to those skilled in the art. The sensors 202 may be configured to measure a characteristic of an aircraft system or component. For example, the fuselage 103 may include a sensor 123 for sensing outside air temperature (OAT) and a sensor 125 for sensing the liquid water content (LWC) of the air passing over the fuselage 103. Sensors 202 such as sensors 123 and 125 may be configured to transmit the measurements to a controller 127, thereby providing sensor feedback about the aircraft system to controller 127. The sensor feedback may be, for example, a speed signal, or may be position feedback, temperature feedback, pressure feedback or other data. In this regard, sensors 123 and 125 may be in electrical communication with a controller 127.

In various embodiments, controller 127 may be in electronic communication with a pilot through a control interface 175, for example, a set of switches, buttons, a multifunction display, and/or the like that a pilot can operate. The control interface 175 may display information such as sensor data from the sensors 202 or processed information from the controller 127. The control interface may output command signals to the controller 127 in response to receiving an interaction via the control interface. In various embodiments, the command signals may be used as an input to an ice protection logic 204 of the controller 127. The ice protection logic 204 may control, via controller 127, various electrical heating elements of an ice protection system of the aircraft 101.

Figure 3A:
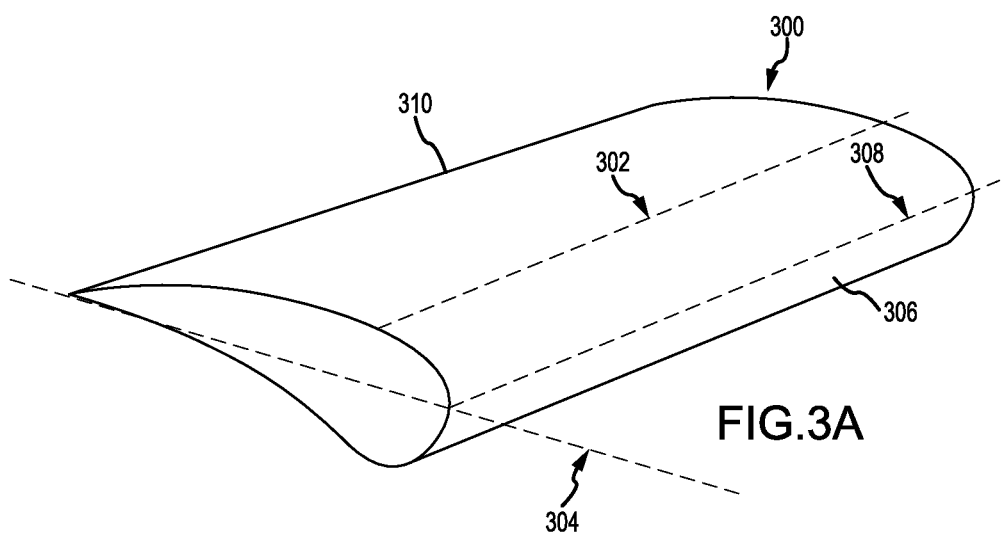
FIG. 3A illustrates a partial perspective view of an exemplary rotor blade, in accordance with various embodiments.
Figure 3B:
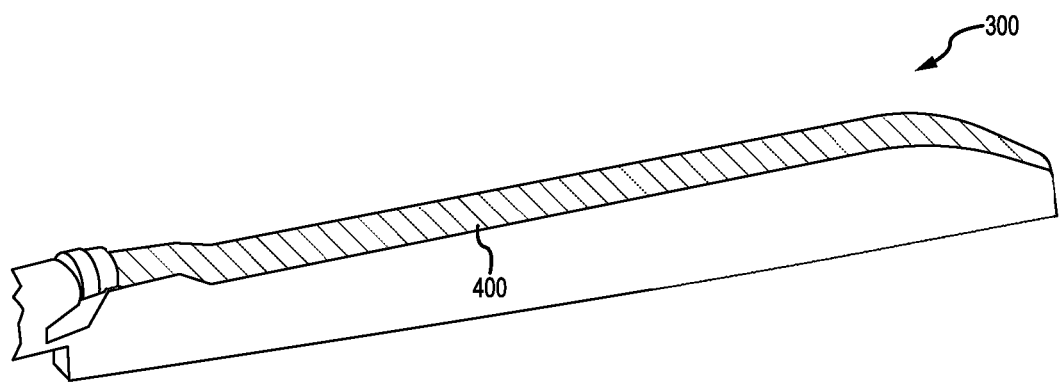
FIG. 3B illustrates an ice protection system of a rotor blade, in accordance with various embodiments.

In various embodiments, and with additional reference to FIGS. 3A and 3B an exemplary airfoil 300 (e.g., such as one of rotor blades 119, 121) is illustrated. FIG. 3A illustrates partial perspective view of an exemplary rotor blade 300. Airfoil 300 may be is susceptible to an ice buildup. Rotor blade 300 includes a spanwise axis 302, a chordwise axis 304, a leading edge 306, a leading edge axis 308, and a trailing edge 310. As illustrated in FIG. 3B, airfoil 300 comprises an ice protection system 400. Ice protection system 400 may comprise one or more electrical heating mats (e.g., a first heating mat 402 and a second heating mat 404) which may be coupled to the leading edge 306 of the airfoil 300 as denoted by the shaded area. A heating mat comprises an electrically resistive material and is configured to warm the leading edge of the airfoil 300. The heating mat extends along the spanwise axis 302 between the inboard and outboard edge of the airfoil 300 and wraps over the dorsal and ventral surface of the airfoil 300. In this regard, the heating mat extends along the chordwise axis 304 aft of the leading edge relatively above and below the leading edge axis 308. Stated another way, the heating mats may be wrapped around the leading edge toward the trialing edge.

Figure 4A:
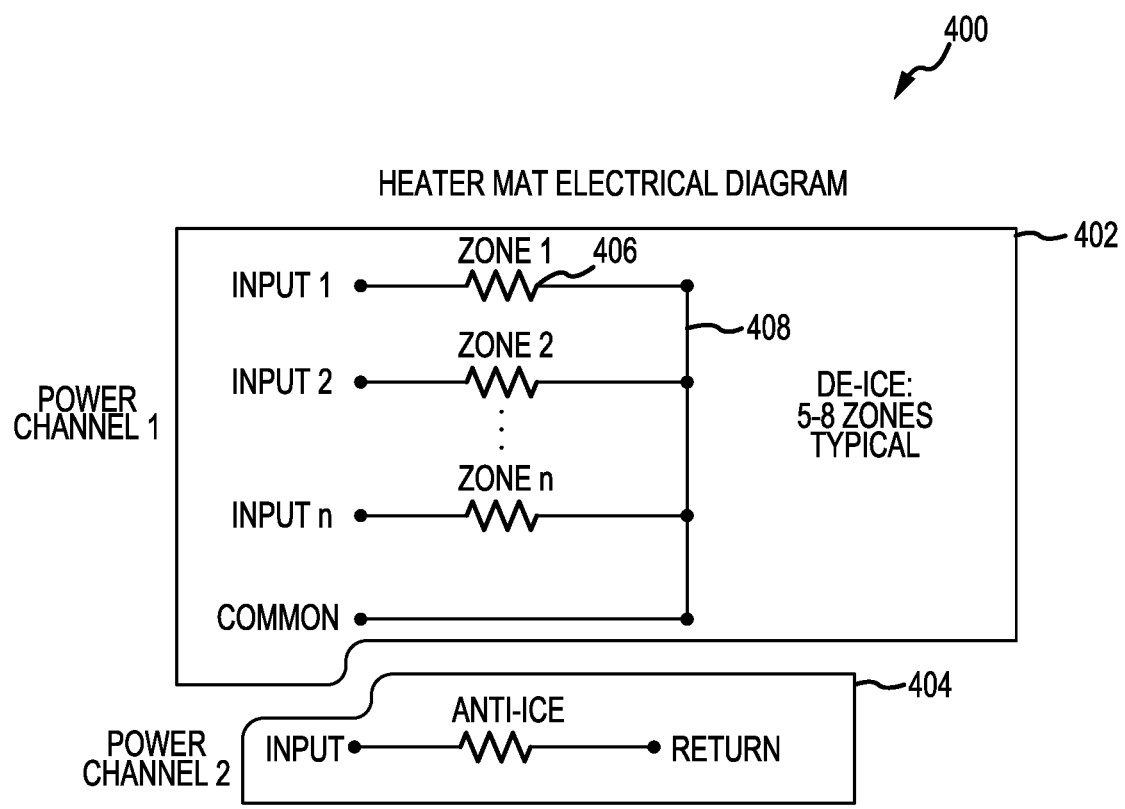
FIG. 4A illustrates a schematic block diagram of an ice protection system, in accordance with various embodiments

In various embodiments and with additional reference to FIG. 4A, ice protection system 400 is illustrated in schematic block diagram. Ice protection system 400 includes a first heating mat 402 and a second heating mat 404. Each heating mat 402, 404 may be receive electrical power from a respectively independent power supply channel. The heating mats 402, 404 may comprise a metallic foil material such as a non-conductive polymer backed metallic foil suitable for etching. In various embodiments, the first heating mat 402 and the second heating mat 404 may comprise separately etched layers of ice protection system 400. Heating mats 402, 404 may comprise any suitable resistive heating material suitable for forming to the leading edge of the airfoil 300. A plurality of resistive heating elements 406 may be etched in the metallic foil thereby defining a plurality of heating zones of the respective heating mat. In like regard, electrical connections 408 (i.e. busbars) between the plurality of heating elements 406 and the power supply may be etched into the metallic foil material. In this regard, the etched busbar portions of the heating mat may be integral to the respective resistive element and isolated from other elements. Stated another way, the busbar portions may be contiguous with the electrically resistive material thereby enabling a dual functionality as an electrical coupling and as an additional heating element of the respective heating zone.

Figure 4B:
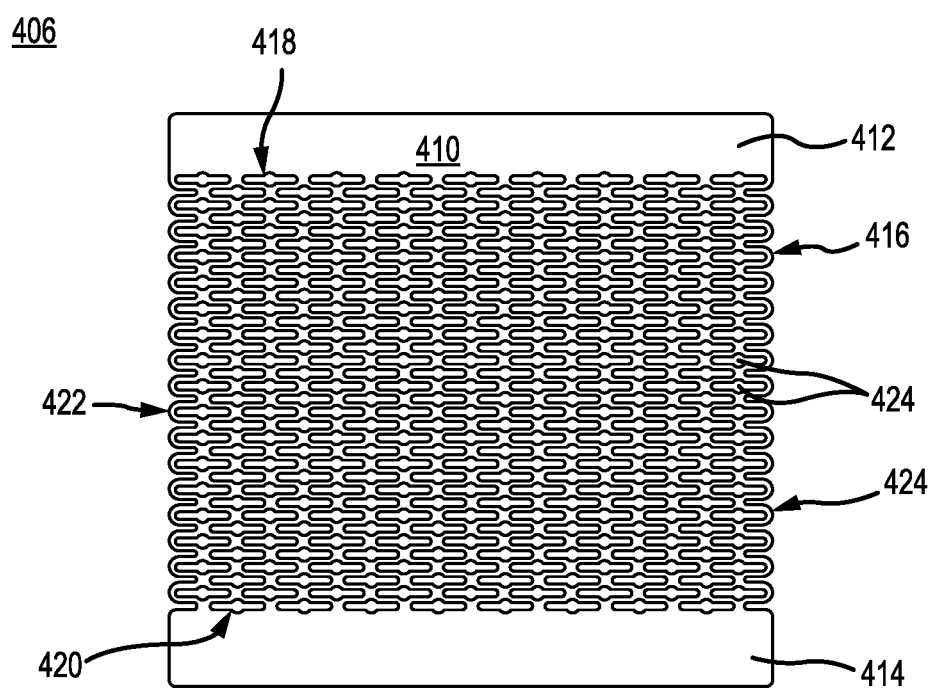
FIG. 4B illustrates a resistive heating element of an ice protection system, in accordance with various embodiments.

In various embodiments and with additional reference to FIG. 4B, a resistive heating element 406 is shown illustrating details of etching on the metallic foil material 410. The metallic foil material 410 may include a first junction strip 412, a second junction strip 414, and a patterned region 416 extending relatively between the junction strips (412, 414). The patterned region 416 is bounded by a first end 418, a second end, 420, a first lateral edge 422, and a second lateral edge 424. The patterned region 416 may comprise a plurality of holes 426 which are keyhole-shaped with rounded edges at the ends of the keyhole. A long dimension of the keyhole-shaped holes is oriented transverse to the overall direction of current flow in the resistive element 406. In this regard, the patterned region 416 comprises multiple conductive paths which tend to improve reliability of the resistive element 406 by ensuring a break or a plurality of breaks in the patterned region 416 of the metallic foil material 410 (i.e., portions relatively between the holes 424) will not inhibit current flow across the resistive element 406. In various embodiments, the ends (418, 420) of the patterned region 416 may extend through the junction strips (412, 414) to the edges of the metallic foil material 410 and, thereby, the entirety of the metallic foil material may comprise the patterned region 416. As discussed above, the busbar portions may be integral to the resistive elements and the patterned region 416 may extend through the busbars of the resistive element 406. In this regard, the busbar portions may be monolithic with the resistive element 406.

Figure 5:
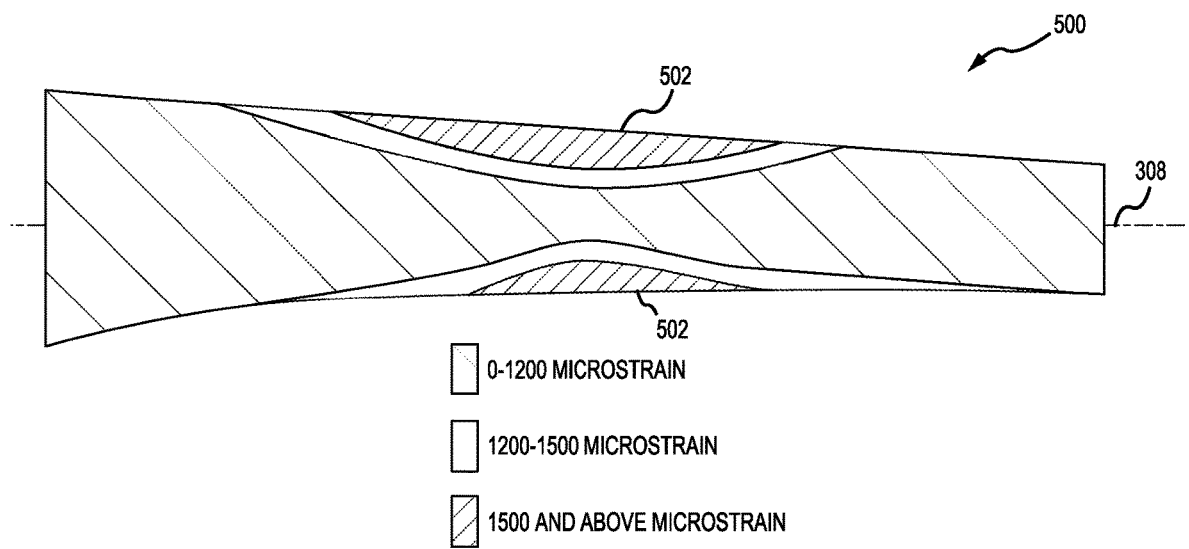
FIG. 5 illustrates a strain field plot of an airfoil, in accordance with various embodiments.

In various embodiments and with additional reference to FIG. 5, a strain field plot 500 of the airfoil 300 is illustrated. Plot 500 shows the aerodynamic surface of airfoil 300 broken away, unfolded, and laid flat axially along the leading edge axis 308. Plot 500 extends from the leading edge axis 308 toward a trailing edge boundary 508 of the ice protection system 400. Plot 500 is characterized by relatively low strain at the leading edge with strain concentrations building chordwise at the mid-span portion of the wrap toward the trailing edge boundary 508. Portions of the ice protection system 400 subjected to the relatively high strain at the corresponding mid-span portion tend to undergo accelerated degradation. For example, wired, bonded, or soldered electrical coupling may tend to suffer accelerated fatigue failures. In this regard, the dual functionality of a busbar portion contiguous with the resistive material is desirable. Ice protection system 400 may benefit of increased operational life by reducing a number of electrical couplings in high strain areas by substitution with busbar portions of the electrically resistive material.

Figure 6:
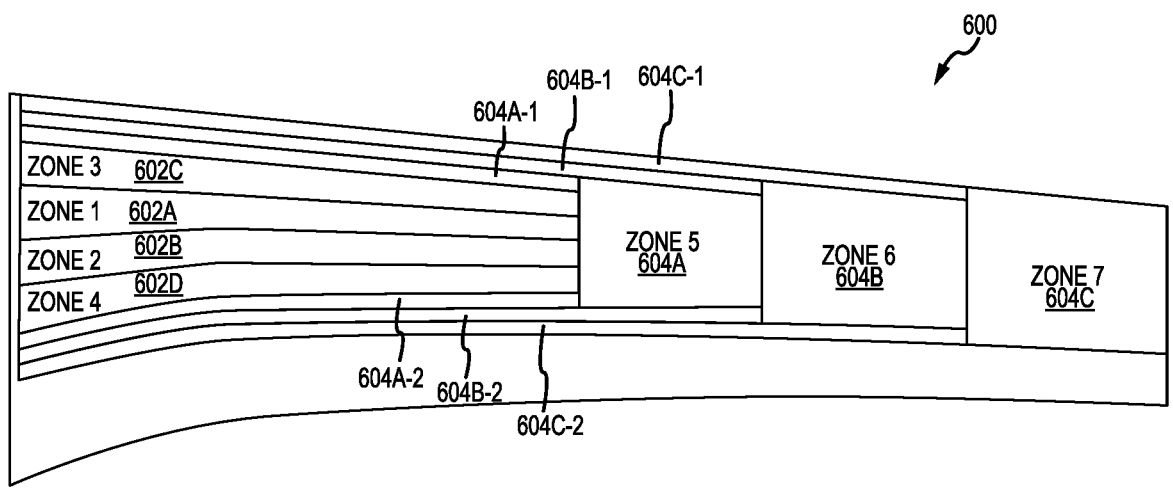
FIG. 6 illustrates a heating mat of an ice protection system, in accordance with various embodiments.

In various embodiments and with additional reference to FIG. 6, an exemplary electrical heating mat 600 (e.g., 402, 404) of ice protection system 400 is illustrated in schematic block diagram broken away, unfolded, and laid flat axially along the leading edge axis 308. The electrically resistive material of heating mat 600 may be etched to define a plurality of spanwise zones 602, chordwise zones 604, and respectively associated busbar portions. Heating mat 600 may be etched such that each zone is defined by a single coplanar layer of resistive elements. In this regard, heat transfer may be optimized and component weight may be reduced by condensing multiple layers of heating elements to a single layer. Heating mat 600 includes a first spanwise zone 602A, a second spanwise zone 602B, a third spanwise zone 602C, and a fourth spanwise zone 602D. In various embodiments, each of the spanwise zones may be relatively inboard of the first chordwise zone 604A. In like regard the second chordwise zone 604B may be outboard of the first chordwise zone 604A and the third chordwise zone 604C may be outboard of the second chordwise zone 604B. In various embodiments, each chordwise zone 604 may have a respectively corresponding and contiguous first and/or second busbar portion. For example, first chordwise zone 604A may have a corresponding first busbar portion 604A-1 and a second busbar portion 604A-2. The second chordwise zone 604B may have a corresponding first busbar portion 604B-1 and second busbar portion 604B-2. The third chordwise zone 604C may have a corresponding first busbar portion 604C-1 and second busbar portion 604C-2. The busbar portions may extend along the spanwise axis 302 parallel the spanwise portions 602 and relatively aft (toward the trailing edge 310) thereof. In this regard, the busbar portions may delimit the chordwise extent along the chordwise axis 304 of the spanwise zones 602.

Figure 7:
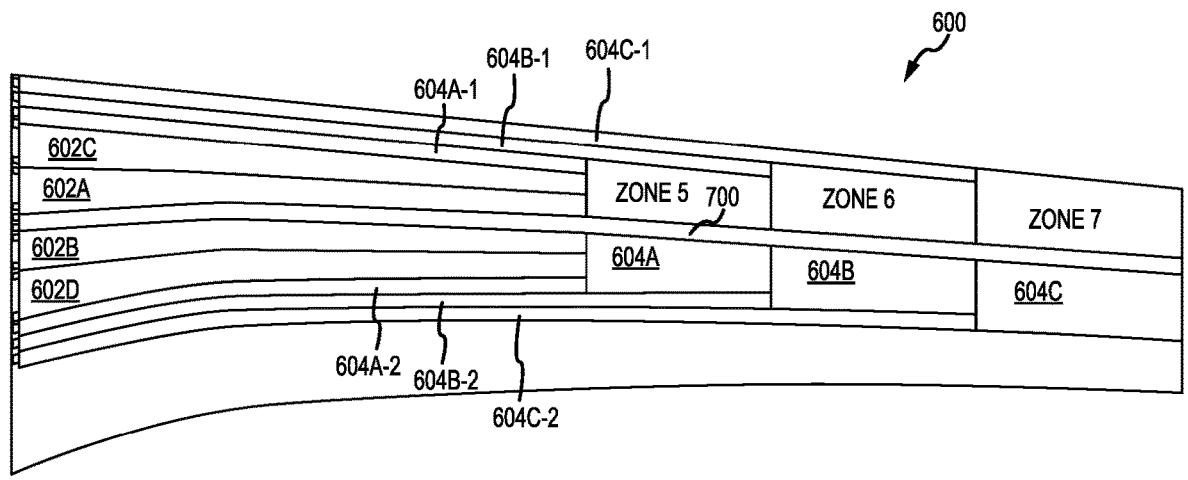
FIG. 7 illustrates an anti-ice strip of an ice protection system, in accordance with various embodiments.

In various embodiments and with additional reference to FIG. 7, electrical heating mat 600 of ice protection system 400 is illustrated in schematic block diagram broken away, unfolded, and laid flat axially along the leading edge axis 308 as including an anti-ice strip zone 700. Zone 700 is etched in a different layer than coplanar layer of the spanwise zones 602, the chordwise zones 604, and the respectively associated busbar portions. In this regard, zone 700 is a separate isolated circuit which may be driven by a separate power channel and/or bus (see e.g., second heating mat 404 of FIG. 4). Zone 700 is overlaid across the spanwise zones 602 and the chordwise zones 604 such that zone 700 extends along the leading edge axis 30 and coincides with the leading edge 306.

In various embodiments, and with renewed reference to FIG. 2, controller 127 may be integrated into computer systems onboard an aircraft, such as, for example, tiltrotor aircraft 101. In various embodiments, controller 127 may comprise a processor. In various embodiments, controller 127 may be implemented in a single processor. In various embodiments, controller 127 may be implemented as and may include one or more processors and/or one or more tangible, non-transitory memories and be capable of implementing logic. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 127 may comprise a processor configured to implement various logical operations in response to execution of instructions, for example, instructions stored on a non-transitory, tangible, computer-readable medium configured to communicate with controller 127.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 8:
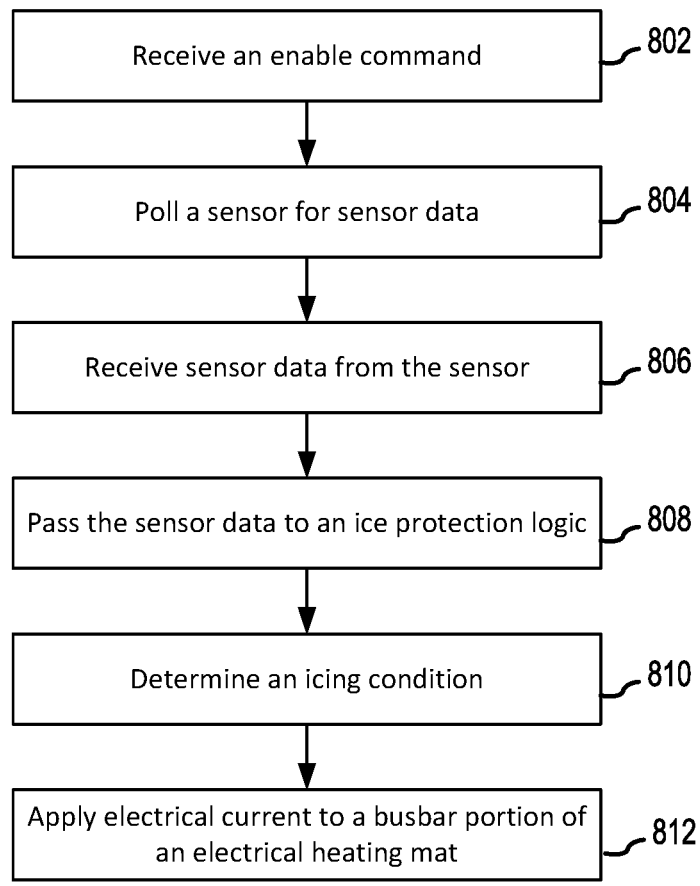
FIG. 8 illustrates a method of de-icing, in accordance with various embodiments.

In various embodiments, and with additional reference to FIG. 8, a method 800 of de-icing is illustrated. The controller 127 may receive an activate command from the control interface 175. Controller 127 may pass the activate command to the ice protection logic 204. In response to the activate command, the ice protection logic 204 may command a power supply 206 to supply power to one or more zones of ice protection system 400. In this regard, controller 127 may apply an electrical current to a busbar portion of a heating mat such as heating mat 600. Controller 127 may receive an enable command from the control interface 175 (step 802). In response to the enable command, controller 127 may poll sensors 202 for sensor data (step 804). In response to polling sensors 202, controller 127 may receive sensor data including an air temperature data and a liquid water content data (step 806). Controller may pass the air temperature data and the liquid water content data to the ice protection logic 204 (step 808). The ice protection logic 204 may determine, based on the air temperature data and the liquid water content data, an icing condition of the aircraft (step 810). In response to determining the icing condition of the aircraft, the ice protection logic 204 may command the power supply 206 to supply power to one or more zones of ice protection system 400. In this regard, controller 127 may apply an electrical current to a busbar portion of a heating mat such as heating mat 600 in response to an icing condition (step 812). In various embodiments, the controller 127 may apply current to the anti-ice strip zone 700 in response to the enable command. In this regard, the anti-ice strip zone 700 may be continuously active in response to the enable command and the controller may selectively apply current to the spanwise zones 602 and the chordwise zones 604 in response to the enable command and determining the icing condition.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures.

The scope of the disclosures is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiment.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An ice protection system for an airfoil comprising:
an electrical heating mat comprising an electrically resistive material, wherein the electrically resistive material defines a first spanwise zone and a first chordwise zone of the airfoil, wherein at least one of the first spanwise zone or the first chordwise zone include a first busbar portion contiguous with the electrically resistive material, wherein the electrical heating mat is etched such that each of the first spanwise zone, the first chordwise zone, and the first busbar portion are coplanar in a first layer of the ice protection system; and
an anti-ice strip zone, wherein the anti-ice strip zone is etched in a second layer different from the first layer, and wherein the anti-ice strip zone is overlaid across the first spanwise zone and the first chordwise zone such that the anti-ice strip zone extends along a leading edge axis and coincides with a leading edge.

2. The ice protection system of claim 1, wherein the electrically resistive material is a metallic foil.

3. The ice protection system of claim 1, wherein the first busbar portion extends along a spanwise axis parallel to the first spanwise zone.

4. The ice protection system of claim 1, wherein the first spanwise zone is inboard of the first chordwise zone.

5. The ice protection system of claim 4, further comprising a second spanwise zone, a third spanwise zone, a second chordwise zone, and a third chordwise zone.

6. The ice protection system of claim 5, wherein the second chordwise zone is outboard of the first chordwise zone, the third chordwise zone is outboard of the second chordwise zone, and each of the second spanwise zone and the third spanwise zone are inboard of the first chordwise zone.

7. The ice protection system of claim 6, further comprising a second busbar portion wherein each of the first busbar portion and the second busbar portion are contiguous with the first chordwise zone.

8. The ice protection system of claim 7, wherein a chordwise extent along a chordwise axis of each of the first spanwise zone, the second spanwise zone, and the third spanwise zone is delimited by the first busbar portion and the second busbar portion.

9. The ice protection system of claim 1, further comprising a second electrical heating mat of the electrically resistive material.

10. The ice protection system of claim 1, wherein the first spanwise zone and the first chordwise zone are defined by a respective first resistive element and a second resistive element, wherein the first busbar portion is monolithic with at least one of the first resistive element or the second resistive element.

* * * * *